United States Patent [19]

Okada et al.

[11] 4,311,904
[45] Jan. 19, 1982

[54] AUTOMATIC FOCUS ADJUSTING DEVICE

[75] Inventors: Masashi Okada, Yotsukaido; Yuji Akiyama; Takaharu Kawada, both of Kawasaki; Atsushi Kawahara, Tokyo, all of Japan

[73] Assignee: Nippon Kogaku K.K., Tokyo, Japan

[21] Appl. No.: 100,007

[22] Filed: Dec. 4, 1979

[30] Foreign Application Priority Data

Dec. 5, 1978 [JP] Japan ................... 53-149686

[51] Int. Cl.³ .................................... G01J 1/36
[52] U.S. Cl. .................................... 250/204; 354/25
[58] Field of Search ............... 250/204, 201; 354/25; 356/4

[56] References Cited

U.S. PATENT DOCUMENTS 4,258,989  3/1981  Tokutomi et al. ........... 250/204 X

*Primary Examiner*—David C. Nelms
*Assistant Examiner*—Darwin R. Hostetter
*Attorney, Agent, or Firm*—Fitzpatrick, Cella, Harper & Scinto

[57] ABSTRACT

An automatic focus adjusting device comprises an optical system for forming the image of a sample to be examined at the image formation point, a first image sensor disposed at a first position for receiving the light image of the sample and converting it into an electrical signal, a second image sensor disposed at a second position for receiving the light image of the sample and converting it into an electrical signal, signal processing systems for processing the signals from the first and second image sensors, and a servo device for controlling the vertical position of the sample relative to the image forming optical system.

6 Claims, 32 Drawing Figures

→ VERTICAL MOVEMENT OF STAGE

AUTOMATIC FOCUS ADJUSTING DEVICE

BACKGROUND OF THE INVENTION

1. Field of the Invention

This invention relates to an automatic focus adjusting device, and particularly to an improvement in the automatic focus adjusting device of a microscope.

2. Description of the Prior Art

In an example of the automatic focus adjusting device of the conventional microscope, first and second one-dimensional image sensors are disposed rearwardly and forwardly, respectively, of the image formation point, namely, at the outer focus position and the inner focus position, respectively. Hereinafter, the outer focus position and the inner focus position will be referred to as the first position and the second position, respectively. The high frequency components of the image outputs from the image sensors become greatest when images are formed on the image sensors. If the high frequency components from the first and second image sensors for movement of a sample stage are symmetrical with respect to the image formation point, the zero crossing point of the difference between the high frequency components of the two outputs may be said to be the image formation point.

That the zero crossing point is the image formation point is based on the premise that the light information entering the first and second image sensors is completely symmetrical with respect to the image formation point. However, in the conventional arrangement and construction, the image at the first position has been larger than the image at the second position and thus, a difference has been created between the sizes of the images on the two sensors. Accordingly, if the lengths of the sensors are equal, a difference has been created between the amounts of light information seized. Also, due to the nature of the objective lens, the enlarged image at the first position has been poorer in contrast and so, the high frequency component output thereof has been relatively small. Accordingly, the outputs of the two sensors have become asymmetric and therefore, the zero crossing point of the difference therebetween has not exactly corresponded to the image formation point, thus making it difficult to effect the focusing with high accuracy.

SUMMARY OF THE INVENTION

It is therefore a primary object of the present invention to provide a construction in which the outputs of the image sensors disposed at the outer focus position (first position) and the inner focus position (second position) are exactly symmetrical with respect to the image formation point, and thereby provide an automatic focus adjusting device which is higher in accuracy.

The present invention consists in an automatic focus adjusting device comprising an optical system for forming the image of a sample to be examined at the image formation point, a first image sensor disposed at a first position spaced apart by a predetermined distance rearwardly from the image formation point for receiving the light image of the sample and converting it into an electrical signal, a second image sensor disposed at a second position spaced apart by a predetermined distance forwardly from the image formation point for receiving the light image of the sample and converting it into an electrical signal, signal processing systems for processing the signals from the first and second sensors, and a servo device for controlling the vertical position of the sample relative to the image forming optical system with the zero crossing point of the difference signal corresponding to the image formation point. The automatic focus adjusting device of the present invention further includes means for rendering the effective value output from the first image sensor and the effective value output from the second image sensor to the same level in magnitude.

The invention will become more fully apparent from the following detailed description thereof taken in conjunction with the accompanying drawings.

DESCRIPTION OF THE PREFERRED EMBODIMENTS

Figure 1:
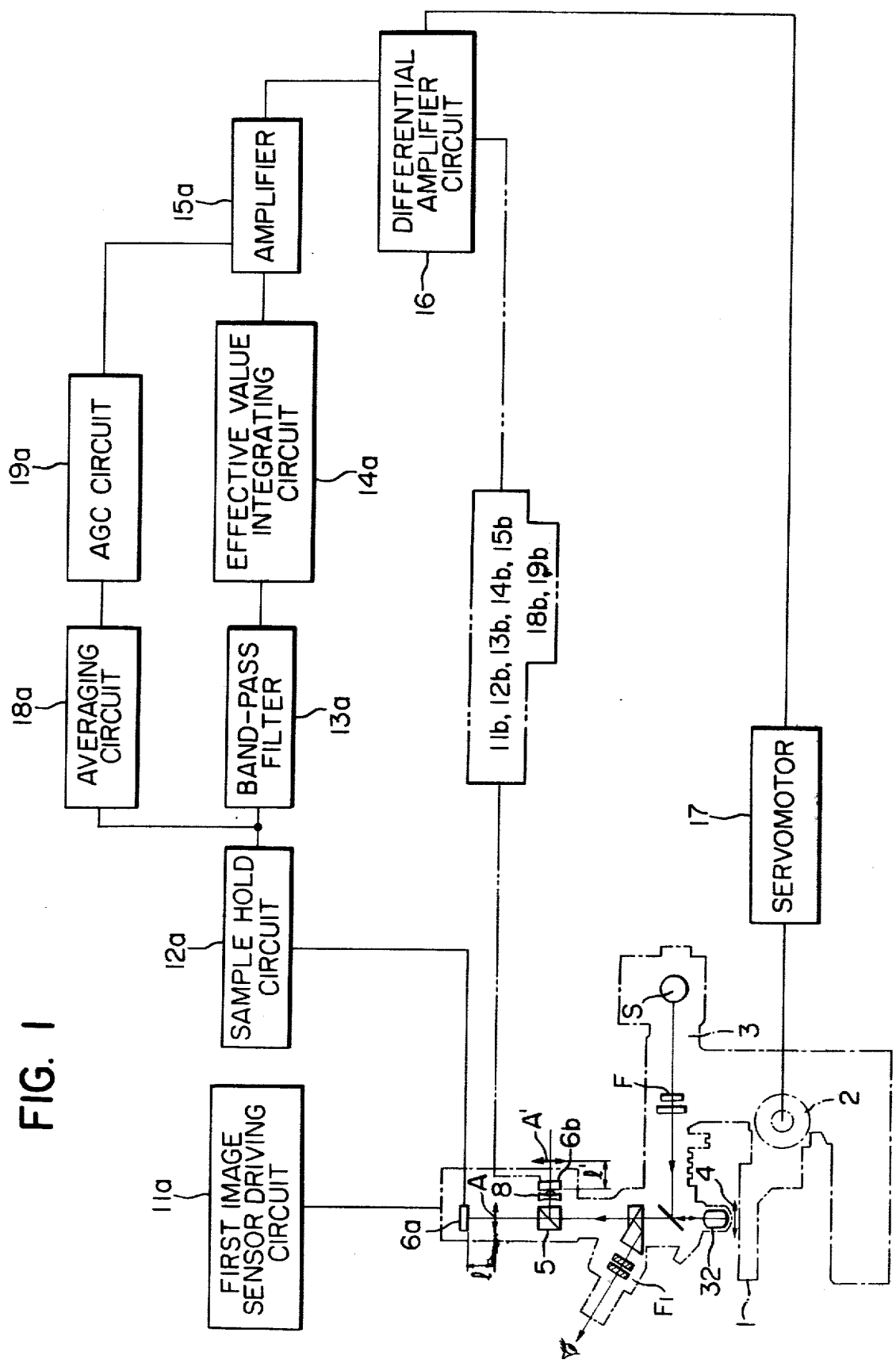
FIG. 1 shows the construction of a first embodiment in which the present invention is applied to a metallurgical microscope.

FIG. 1 shows a first embodiment of the automatic focus adjusting device according to the present invention. This embodiment is one applied to an epi-illumination metallurgical microscope, but a similar construction can be obtained even in the case of a dia-illumination microscope. A sample 4 on a stage 1 is vertically moved to adjust the focus by a stage vertically moving handle 2. An epi-illumination device 3 having a light source S is illuminating the sample 4. The illumination light reflected from the sample 4 is imaged by an objective lens 32, and part of the light passed through a beam splitter 5 is imaged at a position A in the drawing, while part of the light reflected by the beam splitter 5 is imaged at a position A' in the drawing. The imaging positions A and A' are optically equivalent. A first image sensor 6a is disposed at a first position (outer focus position) of distance l rearward of the position A, and a second image sensor 6b is disposed at a second position (inner focus position) of distance l' forward of the position A'. The first image sensor 6a is scanned by a first image sensor driving circuit 11a and the light image output is passed via a sample hold circuit 12a and through a band-pass filter 13a. The high frequency component of the light image is taken out by the band-pass filter 13a and integrated by an effective value integrating circuit 14a during a predetermined time period and converted into an energy amount, and suitably amplified by an amplifier 15a, whereafter it is applied to a differential amplifier circuit 16. On the other hand, the light image output on the second image sensor 6b is also subjected to similar electrical processing by elements 11b–15b and then applied to the differential amplifier circuit 16. (In FIG. 1, the electrical signal processing system of the image sensor 6b is only shown collectively because it is identical to the electrical signal processing system of the image sensor 6a.)

FIG. 2 shows the light images on the image sensors and the manner of electrical signal processing thereof. FIG. 2A shows the light image on the one-dimensional image sensor when a sample comprising a straight line is vertically moved. The middle of FIG. 2A shows the condition in which the light image is just focused on the image sensor. The scanning of the image sensor is in the direction indicated by arrow. FIG. 2B shows the photoelectric conversion outputs of the light images, and FIG. 2C shows the output waveforms provided by the band-pass filters 13a and 13b and having the high frequency component extracted. FIG. 2D shows the effective value integration output thereof. As shown, it is a curve which assumes a maximum value when the light image is formed on the image sensor. FIG. 2E shows the effective value integration output 33 by the first image sensor 6a and the effective value integration output 34 by the second image sensor 6b as functions with respect to the amount of vertical movement Δ of the stage 1. Since the first position and the second position lie rearwardly and forwardly, respectively, of the image formation point, the output thereof becomes a curve having maximum values on the left and right of the imaging position in FIG. 2E. Output curves 33 and 34 are diferentially added together in the differential amplifier circuit 16 and therefore, the difference signal becomes such as indicated by a solid line 35 in FIG. 2E. If the output curves 33 and 34 are symmetric with respect to the image formation point, the zero crossing point 30 of the difference signal curve 35 corresponds to the position of the image formation point. Accordingly, automatic focus control becomes possible by feeding back the difference signal 21 of the differential amplifier circuit 16 to a servomotor 17, driving the stage vertical moving handle 2 and controlling the difference signal 35 so as to be zero.

Figure 3A:
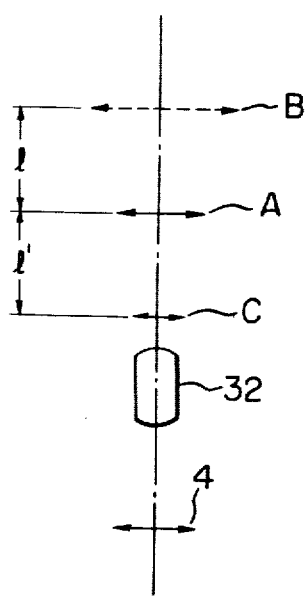
FIGS. 3A-3C show the difference in size between the light images at the inner focus position and the outer focus position and correcting means therefor.
Figure 3B:
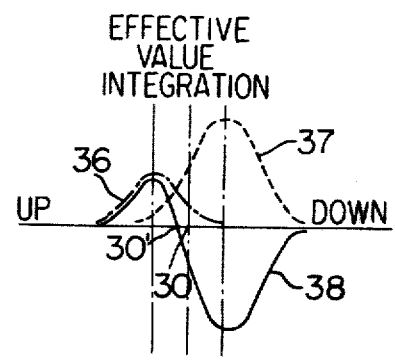

However, this control method is based on the premise that the light images on the first and second sensors at the first position and the second position are symmetrical, but actually the size of the image differs from the first position (outer focus position) B rearward of the image formation point A to the second position (inner focus position) C forward of the image formation point A, as shown in FIG. 3A. In FIG. 3A, the image of the sample 4 is formed at the position A by the objective lens 32 and this position provides the image formation standard position, and the position B of distance l rearward thereof is the first position and the position of distance l' forward thereof is the second position. If the lengths of the sensors are equal, the amount of information seized will be greater at the second position. Also, due to the nature of the objective lens, the image at the second position is poorer in contrast and as a result, the effective value output will become such as shown in FIG. 3B. That is, the effective value output curve 36 of the first image sensor 6a at the first position B is lower in output level than the effective value output curve 37 of the second image sensor 6b at the second position C, and accordingly, the difference signal curve 38 does not effect zero crossing at the image formation point. In FIG. 3B, the positional deviation between 30 and 30' is the focus error.

Figure 3C:
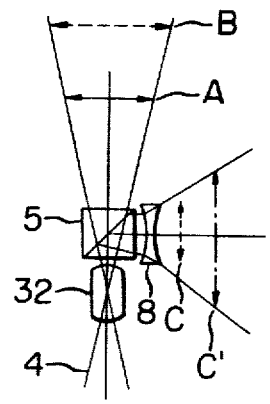

According to the present invention, to eliminate the above-described disadvantage, an image enlarging concave lens 8 is inserted forewardly of the second image sensor 6b in FIG. 1. The construction of this portion is shown in FIG. 3C. The image 3C at the inner focus position before enlarged becomes the image C' enlarged by the concave lens 8, and the image B at the outer focus position and the image C' become equal in size. Accordingly, the outputs from two image sensors become symmetric with respect to the image formation point, and the zero crossing point of the difference signal curve exactly corresponds to the focus position and this, accurate control becomes possible.

Figure 2A:
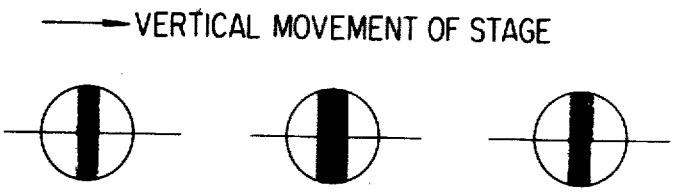
FIGS. 2A-2E show the conditions of electrical outputs with respect to the vertical movement of the stage.
Figure 2B:
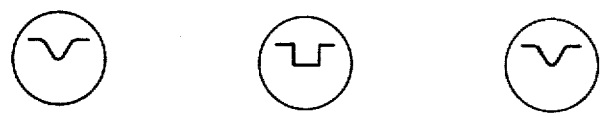
Figure 2C:
Figure 2D:
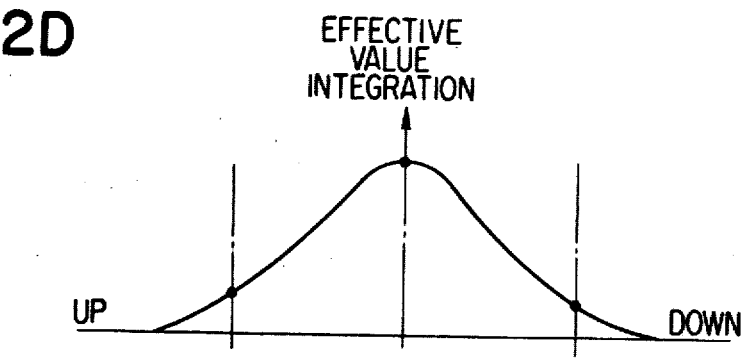
Figure 2E:
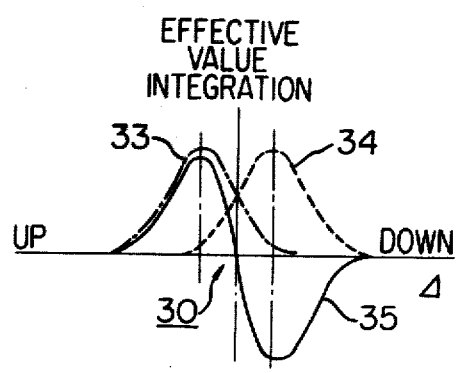
Figure 4:
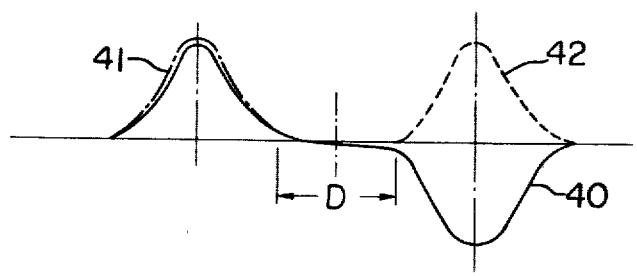
FIG. 4 shows the electrical output when the distances between the image formation point and the first and second positions are too great.

In the construction of the present embodiment, the sensors 6a and 6b are disposed at the positions of predetermined distances l and l' rearward and forward of the image formation point. If the distances l and l' are set so that the output curves from the image sensors 6a and 6b conveniently overlap each other at a high magnification (for example, 100×) as shown in FIG. 2E, their peak positions will be greatly deviated at a low magnification (for example, 10×) as shown by the effective value integration output curves 41 and 42 of FIG. 4 and a dead zone D will be created in the vicinity of the center of the difference output curve 40. That is, the difference output is almost zero in the range of the dead zone D and therefore, control becomes impossible in the range of the dead zone D. Accordingly, the present invention includes means for changing over the distances l and l' from the image formation point to the image sensors with the magnification of the objective lens, thereby facilitating the application of servo control.

Also, as the magnification is higher, the intensity of the light images on the image sensors is decreased and this leads to a fear that an electrical output necessary for the servo control cannot be obtained. Accordingly, the present embodiment includes means for changing over the gains of the amplifiers 14a and 14b of FIG. 1 simultaneously with the change-over of the objective lens to maintain the magnitude of the difference output constant. The same result may also be obtained by optically putting an ND filter into and out of the light path.

The magnitude of the electrical output depends on the reflection factor or the transmission factor of the sample 4. In the present embodiment, the average of the outputs of the image sensors is taken by the output averaging circuit 18a, 18b of FIG. 1 and the output average value so obtained controls AGC (auto gain control) circuits 19a, 19b to control the gains of the amplifiers 15a, 15b. In this case, adjustment is possible also with respect to the variation in light intensity of the images resulting from the aforementioned variation in magnification.

Where A.G.C. is so effected by the output average value, substantially sufficient adjustment is possible for the variation in average brightness on the surface of the sample attributable to the reflection factor or the transmission factor of the sample, but depending on whether the patterns on the surface of the sample are simple or complicated, more specifically, depending on the variation in number of the patterns, sufficient adjustment is not possible for the variation in contrast difference of the patterns. Therefore, depending on the patterns of the sample, it is not possible to maintain the focusing signal always constant and thus, it is impossible to maintain high focusing accuracy. A second embodiment which solves this problem will hereinafter be described.

Figure 5:
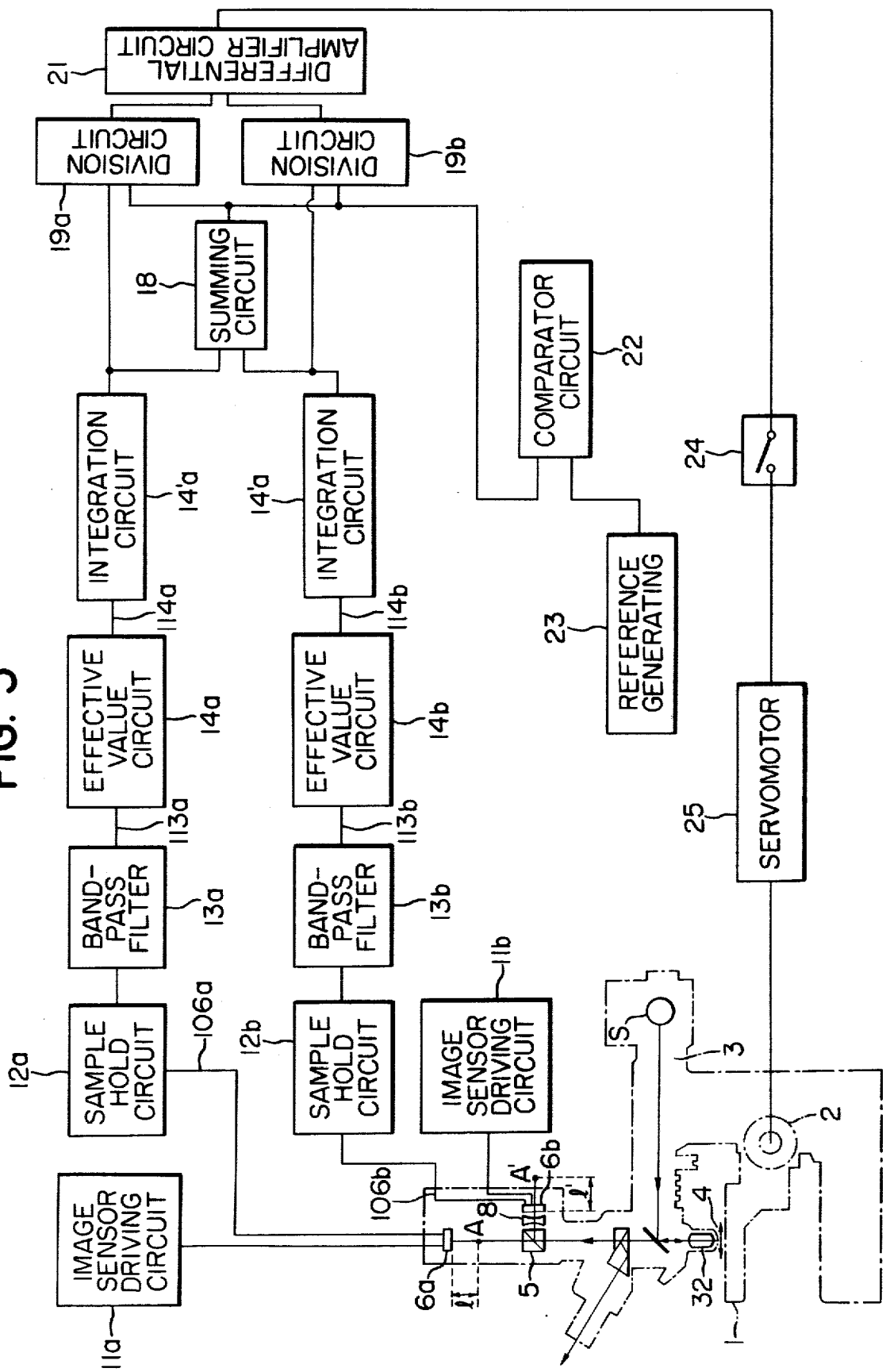
FIG. 5 shows the construction of a second embodiment according to the present invention.

The second embodiment is one in which the present invention is used in an IC pattern examining microscope. FIG. 5 is a schematic view of the second embodiment and a block diagram of the signal processing system. The construction of the microscope portion is substantially similar to that of the first embodiment shown in FIG. 1, and similar reference characters designate similar members. Therefore, only the signal processing system will be described hereinafter.

First and second image sensors 6a and 6b are electrically scanned by image sensor driving circuits 11a and 11b, respectively, and the light image outputs thereof are applied through sample hold circuits 12a and 12b to band-pass filters 13a and 13b, respectively. The frequency components of the light images are taken out by the band-pass filters 13a and 13b and converted into energy amounts by effective value circuits 14a and 14b and integrated by integration circuits 14'a and 14'b for a predetermined time period. The effective value circuits 14a and 14b are square circuits or absolute value circuits. The signals from the integration circuits 14'a and 14'b are added together by a summing circuit 18 and the sum is divided by division circuits 19a and 19b with the output of the summing circuit 18 as the denominator and the outputs of the integration circuits 14'a, 14'b as the numerator, whereby auto gain control (A.G.C.) function is performed. The outputs of the division circuits 19a and 19b are applied to a differential amplifier 21, the output of which operates a servomotor 25 through an analog switch 24. The automatic focusing of the sample 4 is accomplished by such a series of feedback systems.

On the other hand, the output of the summing circuit 18 is also applied to a comparator circuit 22. The comparator circuit 22 compares the output of the summing circuit 18 with a reference voltage R generated by reference voltage generating means 23 and when the output of the summing circuit 18 is lower than the reference voltage R, the comparator circuit 22 opens the analog switch 24 to stop the servomotor. This reference voltage is set to a predetermined value and limitation of the automatic focusing is accomplished by these means. That is, where the output signals from the image sensors are very weak as when the deviation amount (defocus amount) from the focused position is great or when little or no pattern is present on the surface of the sample, these means may prevent the output of the differential amplifier 21 from being in the direction opposite to the direction for effecting the focusing under the influence of noise or the like. Also, the signal applied as the denominator of the divider used for auto gain control generally has its minimum magnitude limited and when the signal is lower than such minimum magnitude, the divider does not normally operate and said means may prevent this.

The second embodiment will now be compared with the first embodiment to have the signal processing system of the second embodiment more deeply understood.

FIG. 6 shows the pattern of the sample 4 and examples of the output of each circuit corresponding thereto.

Figure 6A:
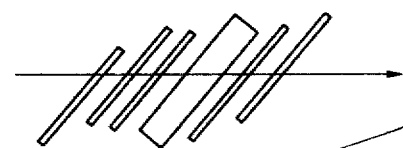
FIGS. 6A-6F show the waveforms of the output signals of the various circuits in the second embodiment.
Figure 6B:
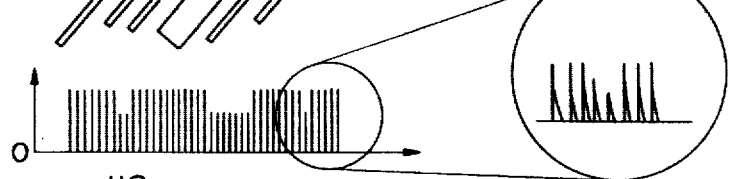
Figure 6C:
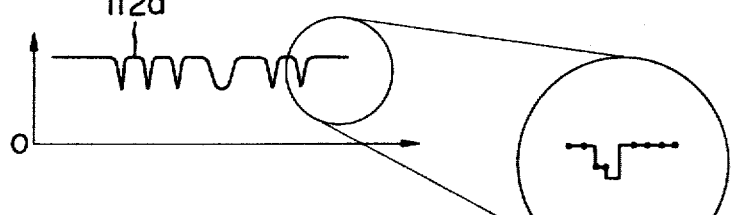
Figure 6D:
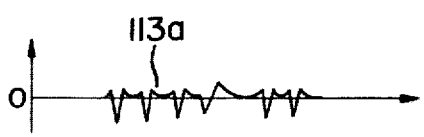
Figure 6E:
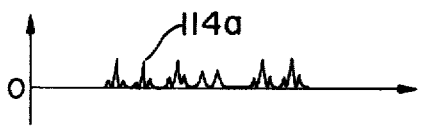
Figure 6F:
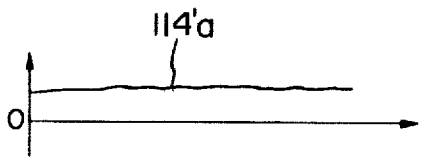

FIG. 6A shows an example of the pattern of the sample 4 and the arrow therein indicates the scanning direction of the image sensors. FIG. 6B shows the output of the image sensor 6a and the interior of the circle shows a partial enlarged view. FIG. 6C shows the output 112a of the sample hold circuit 12a, FIG. 6D shows the output 113a of the band-pass filter 13a, FIG. 6E shows the output 114a of the effective value circuit 14a, and FIG. 6F shows the output 114'a of the integration circuit 14'a.

Figure 7A:
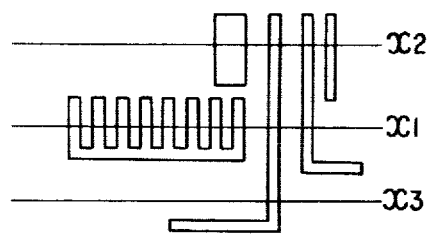
FIGS. 7A-7E show the waveforms of the signals when the number of patterns of the sample differs.
Figure 7B:
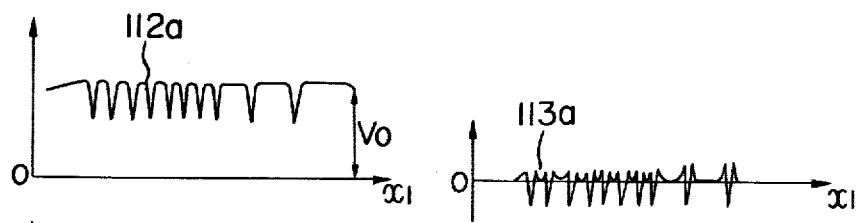
Figure 7C:
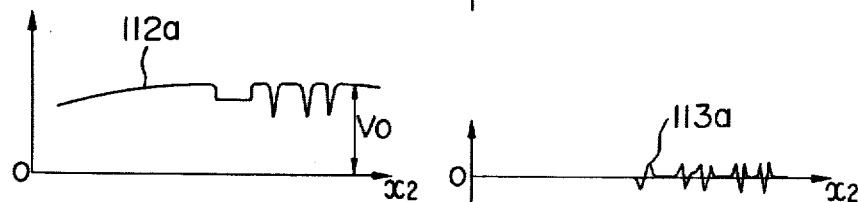
Figure 7D:
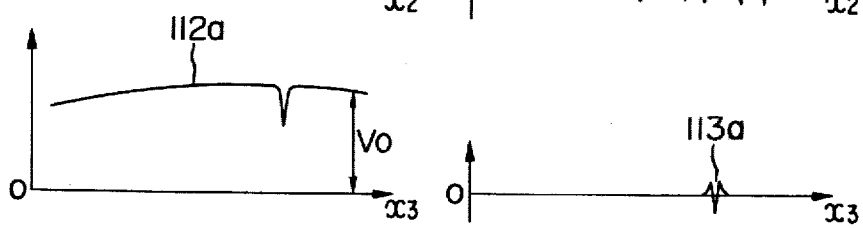
Figure 7E:
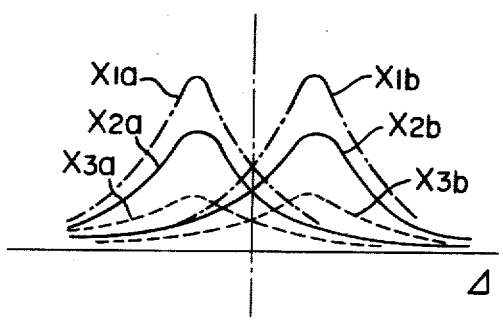

The difference in output signal resulting from the difference in pattern of the sample 4 will now be described. FIG. 7A shows an example of the pattern of the sample 4 and as indicated by scanning lines $x_1$, $x_2$ and $x_3$, it is assumed that different portions of this pattern are scanned by the image sensors. The conditions of the output 112a of the sample hold circuit 12a and the output 113a of the band-pass filter 13a when the first image sensor 6a scans along the three different scanning lines $x_1$, $x_2$ and $x_3$ are shown in FIGS. 7B, 7C and 7D. When the first image sensor scans along the scanning line $x_1$, the pattern is numerous and so, the number of signals is increased as shown in FIG. 7B, and when the first image sensor scans along the scanning line $x_2$, the pattern is decreased to decrease the number of signals as shown in FIG. 7C. When the first image sensor scans along the scanning line $x_3$, there is only one pattern and so, only one signal is produced as shown in FIG. 7D. The outputs of the integration circuit 14'a when the first image sensor scans along these three scanning lines $x_1$, $x_2$ and $x_3$ are $X_{1a}$, $X_{2a}$ and $X_{3a}$ and the conditions thereof are shown in FIG. 7E. In FIG. 7E, the abscissa represents the amount of movement $\Delta$ of the stage, namely, the sample 4, and the ordinate represents the magnitude of the signal. Also, in this Figure, the outputs of the integration circuit 14'b based on the signals from the second image sensor 6b which, like the first image sensor 6a, scans along said three different scanning lines $x_1$, $x_2$ and $x_3$ are shown as $X_{1b}$, $X_{2b}$ and $X_{3b}$, respectively. As shown, when the image sensors scan along the scanning line $x_1$, the number of patterns is greatest and so, the outputs $X_{1a}$ and $X_{1b}$ are greatest, and conversely, when the image sensors scan along the scanning line $x_3$, the number of patterns is least and so, the outputs $X_{3a}$ and $X_{3b}$ are least. It is seen that as the number of patterns is greater, the outputs of the integration circuits 14'a and 14'b are greater. This means that when the number of patterns is small, the detection output is small and the servomotor driving signal itself is also small to reduce the focusing accuracy. Such fluctuation of the output signals resulting from the variation in number of patterns cannot be eliminated simply by effecting the auto gain control by the outputs 112a and 112b of the sample hold circuits 12a and 12b. This is because the output 112a of the sample hold circuit 12a has an equal value of Vo as the average value, as shown in FIGS. 7B–7D. The equal average value is atrributable to the fact that the average brightness of the sample image is equal even if the number of patterns differs.

Also, even if the number of patterns of the sample 4 is one and the same, the contrast of the patterns themselves may sometimes be reduced as when emulsion has been applied onto the sample. With respect to a case where the contrast of the patterns differs thus, the conditions of the output signals will be described in the same manner as the foregoing.

Figure 8A:
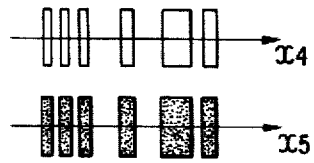
FIGS. 8A-8D show the waveforms of the signals when the pattern of the sample has a contrast difference.
Figure 8B:
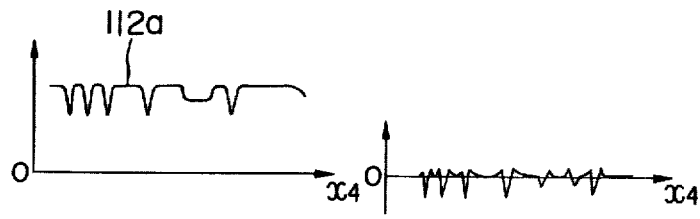
Figure 8C:
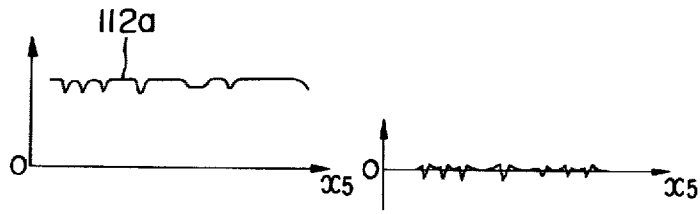
Figure 8D:
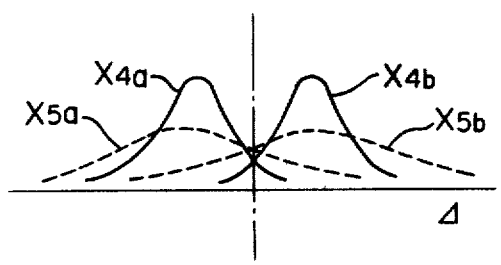

FIG. 8A shows a sample which is equal in number of patterns but differs in contrast of the patterns. It is assumed that, as shown, the scanning line x4 scans the portion which is great in pattern contrast difference and the scanning line x5 scans the portion which is small in pattern contrast difference. The conditions of the output 112a of the sample hold circuit 12a and the output 113a of the band-pass filter 13a when scanning is effected along each scanning line are shown in FIGS. 8B and 8C, respectively. As shown in these Figures, when scanning is effected along the scanning line x4, the contrast difference is great and so, the output 113a of the band-pass filter is a relatively large signal and, when scanning is effected along the scanning line x5, the contrast difference is small and so, the output 113a is small in magnitude although it is equal in signal number to the case of the scanning line x4. Accordingly, as shown in FIG. 8D, a great difference occurs between the outputs of the integration circuit 14'a based on these signals. In FIG. 8D, $X_{4a}$ and $X_{5a}$ are the outputs of the integration circuit 14'a based on the signals from the first image sensor 6a when it scans along the scanning lines x4 and x5, and $X_{4b}$ and $X_{5b}$ are the outputs of the integration circuit 14'b based on the signals from the second image sensor 6b. The abscissa represents the amount of movement of the stage 1, namely, the sample 4. Thus, with a sample having a great contrast difference and a sample having a small contrast difference, as in the aforementioned case where the number of patterns differs, the output signals of the integration circuits 14'a and 14'b are varied even if the average brightness of the sample surface is constant. Accordingly, again in this case, the magnitude of the servomotor driving signal differs and the response speed for the focusing and the focusing accuracy cannot be maintained alway equal by the simple auto gain control using the average value of the sample hold circuit.

Figure 9A:
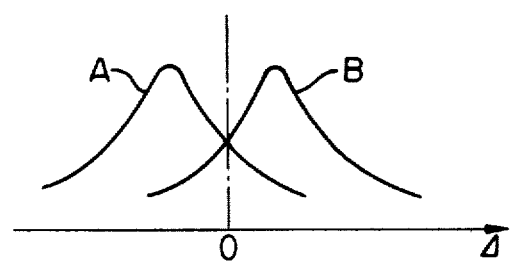
FIGS. 9A-9D show signal waveforms for illustrating A.G.C. means in the second embodiment.
Figure 9B:
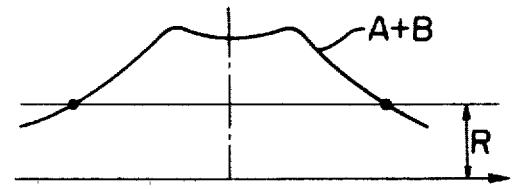
Figure 9C:
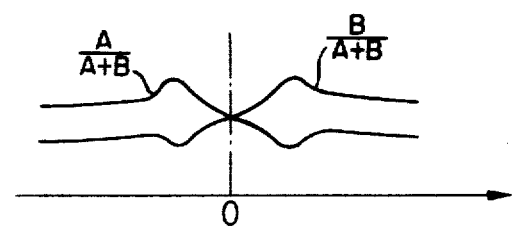

The construction of the present embodiment is based on the premise that the sizes of the sample images formed on the first image sensor 6a and the second image sensor 6b are always made substantially equal by the action of the concave lens 8 and therefore the outputs A and B of the integration circuits 14'a and 14'b based on the output signals from the two image sensors are substantially completely symmetrical as shown in FIG. 9A. FIG. 9A is similar to FIG. 2E and in FIG. 9A, the abscissa represents the amount of vertical movement Δ of the stage, namely, the sample 4. The summing circuit 18 puts out the sum signal A+B of the output signals A and B of the integration circuits 14'a and 14'b, as shown in FIG. 9B. Subsequently, divisions are effected by dividers 19a and 19b with the sum signal A+B as the denominator and the outputs A, B of the integration circuits 14'a, 14'b as the numerator, whereby as shown in FIG. 9C, the signal from the first image sensor 6a is put out as A/(A+B) and the signal from the second image sensor 6b is put out as B/(A+B). The signals from the two image sensors are standardized by such auto gain control function and on the basis of such standardized signals, a differential signal (A−B)/(A+B) as shown in FIG. 9D is put out by a differential amplifier 21, and the detection of the zero crossing point and the driving of the servomotor for automatic focusing are carried out.

Figure 9D:
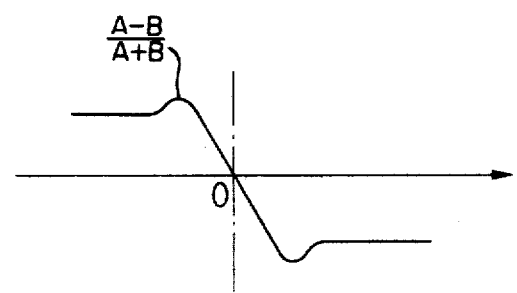

According to such auto gain control means adopted in the second embodiment, both in the case of the sample described with respect to FIG. 7 wherein the number of patterns differs and in the case of the sample described with respect to FIG. 8 wherein the contrast difference differs, the output signals $$\left( \frac{X_{1a}}{X_{1a} + X_{1b}}, \frac{X_{2a}}{X_{2a} + X_{2b}}, \text{etc.} \right)$$

of the dividers 19a and 19b substantially assume the shapes as shown in FIG. 9C and their maximum values are always constant. Moreover, the gradient at the point whereat the two signals $$\left( \text{for example, } \frac{X_{1a}}{X_{1a} + X_{1b}} \text{ and } \frac{X_{1b}}{X_{1a} + X_{1b}} \right)$$

corresponding to the two image sensors 6a and 6b is substantially constant and necessarily, the gradient at the zero crossing point in the output signal of the differential amplifier 21 as shown in FIG. 9D is substantially constant. Thus, the magnitude of the servomotor driving signal for the amount of deviation from the focused position is hardly affected by the variations in number of patterns and contrast difference of the sample. That is, according to the automatic focus adjusting device of the present invention, irrespective of not only the brightness but also the pattern of the object to be examined, the response speed for the focusing can be maintained substantially constant, thus enabling automatic focusing always at a predetermined high accuracy to be accomplished.

Figure 10:
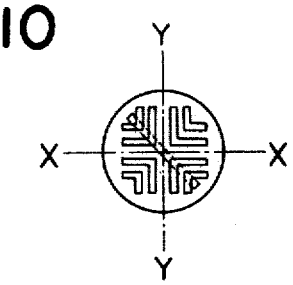
FIG. 10 shows the arrangement of an image sensor when the sample has directionality.

In the above-described embodiments, entirely identical circuits are provided in parallel relationship as the signal processing systems for processing the signals from the first and second image sensors, whereas such construction is not restrictive but a construction may be adopted in which the signals from the two image sensors are alternately processed.

Where the sample 4 is one having directionality such as IC pattern or the like, if the scanning direction of the one-dimensional image sensor is in accord with the directionality of the pattern, there is a fear that the output from the image sensor cannot be obtained. Accordingly, the present invention includes means capable of varying the scanning direction of the image sensor, namely, the direction of arrangement of the image sensor. Where the sample has such a pattern as shown in FIG. 10, the sample 4 has directionalities in the X- and Y-direction of the sample stage and therefore, the image sensor is disposed at an angle of 45° with respect to the X- and Y-direction.

Figure 11:
FIG. 11 is a cross-sectional view showing a sample having step differences.

Also, where the sample 4 is concavo-convex as shown in the cross-sectional view of FIG. 11, the contrast information amount is greatest in L portions and therefore, the focus is adjusted to the L portions. In the present invention, means for imparting offset to the zero crossing point level in such a case to thereby deviate the focus position by a predetermined distance corresponding to the step difference of $H_1$ or $H_2$ portion with respect to the L portions, thereby enabling observation with the focus automatically adjusted to the $H_1$ or $H_2$ portion is included in the comparison differential circuit. When such means is not included, the operation of the automatic focus device must be released and changed over to the manual operation and the device must be manually operated.

Heretofore, from the viewpoint of the aberrations or the like of the image forming system, various filters have been inserted in a portion of the illuminating system (F in FIG. 1), but in view of the spectral characteristic of the image sensor and the quantity of light in case where a color ITV camera is attached, it is desirable to maintain the section from the objective lens 32 to the image forming portion in white light. Accordingly, in the above-described first embodiment, as shown in FIG. 1, various filters are inserted at the position $F_1$ immediately before the eyepiece portion or at a position immediately before the photographing device.

In the present invention, the construction of the first and second image sensors 6a and 6b is such that a spacing is provided between the elements. The light image formed on the image sensor has its edge somewhat blurred even when it is best focused and therefore, an image sensor having its elements arranged with a spacing therebetween is more desirable than an image sensor having its elements arranged continuously. By this, the step function of the output after the sample hold is increased, so that the high frequency component thereof is increased and the effective value output during the best focusing becomes greater to facilitate the servo control.

As has hitherto been described, the automatic focus adjusting device of the present invention enables focusing with higher accuracy.

We claim:

1. An automatic focus adjusting device for forming the image of a sample to be examined at a predetermined imaging position, comprising:
   (a) an image forming optical system for forming the image of said sample;
   (b) a first image sensor disposed rearwardly of said predetermined imaging position;
   (c) a second image sensor disposed forwardly of said predetermined imaging position;
   (d) magnification changing means substantially equalizing the sizes of the images of said sample on said first and second image sensors;
   (e) a signal processing system for processing the output signals of said two image sensors and putting out a first output corresponding to the signal of said first image sensor and a second output corresponding to the signal of said second image sensor;
   (f) differential amplifier means for differentially amplifying said first and second outputs; and
   (g) servo means for moving said sample in the direction of the optic axis of said optical system by the difference signal of said differential amplifier means.

2. An automatic focus adjusting device according to claim 1, wherein said optical system has an objective lens and a beam splitter disposed rearwardly of said objective lens, said first and second image sensors are disposed in light paths separated by said beam splitter, and said magnification changing means is a concave lens disposed between said beam splitter and said second image sensor.

3. An automatic focus adjusting device according to claim 1 or 2, wherein said signal processing system has means for taking out frequency components corresponding to the pattern of said sample from the outputs of said first and second image sensors, and means for effective-value-integrating said frequency components and putting out first and second effective value integration signals.

4. An automatic focus adjusting device according to claim 3, wherein said signal processing system further has auto gain control means.

5. An automatic focus adjusting device according to claim 4, wherein said auto gain control means has a summing circuit for adding together said first and second effective value integration signals, and a division circuit for effecting a division with the output of said summing circuit as the denominator and said first and second effective value integration signals as the numerator.

6. An automatic focus adjusting device according to claim 5, wherein said signal processing system further has reference signal generating means, comparator means and switch means, said comparator means compares the output of said summing circuit with the reference signal, and said switch means effects the switching of said servo means by the output of said comparator means.

* * * * *